United States Patent Office 3,324,082
Patented June 6, 1967

3,324,082
UREIDOMETHYL DIAROMATIC ETHER-ALDEHYDE POLYMERS
Lawrence F. Sonnabend, Midland, Mich., assignor to The Dow Chemical Company, Midland, Mich., a corporation of Delaware
No Drawing. Filed Sept. 15, 1961, Ser. No. 138,286
15 Claims. (Cl. 260—52)

The present invention concerns novel resinous condensation products. In particular, the invention concerns condensation products comprising ureidomethyl diaromatic ethers and formaldehyde or formaldehyde-like materials. The invention further involves urea-formaldehyde-type resins modified with ureidomethly diaromatic ethers.

Cured forms of conventional urea-formaldehyde-type resins are characterized by relatively low resistance to the degradative action of water and the alkalies. As a result, these resins are inefficient as binders for plywood and other composite articles when such articles are subject to continuous or intermittent contact with water or moisture. Such conditions occur, for example, in the ordinary hazards of weathering.

It is, therefore, desirable and an object of the invention to provide novel thermosettable condensation resins having a superior resistance to the degradative action of water and the alkalies. It is a further object to provide improved urea-formaldehyde-type resins most advantageously adapted for use as the heat-curable adhesive component of composite and laminar structures subject to weathering. Other objects and benefits of the invention will become apparent hereinafter as the invention is more fully described.

In accordance with the invention, it was discovered that a highly efficacious heat-hardenable resinoid, i.e., an initial or intermediate condensate precursor of a thermoset resin, is provided as the condensation product of formaldehyde and a ureidomethyl diaromatic ether composition consisting of at least one compound having the general formula:

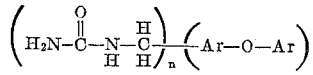

wherein Ar is an aromatic radical and $n$ is an integer from 1 to 4. The terminology "aromatic radical" is exemplified by monocyclic benzene-derived radicals, and nuclearly alkyl and alkoxy substituted derivatives thereof wherein the substituents contain up to 4 carbon atoms and up to two of such substituents on the benzene ring are possible. The ureidomethyl diaromatic ether composition is further characterized by an average ureidomethyl functionality of at least 1.5 and up to 4. Ureidomethyl functionality refers to the number of ureidomethyl substituent groups per diaromatic ether molecule. The manner of representing the ureidomethyl groups in the above formula indicates that is does not matter as to which ring they are attached. Normally when there are even numbers of such substituents, they will be distributed equally on the two rings of the ether molecule. The moles of formaldehyde or molar equivalents of a like material utilized per mole of the diaromatic ether composition can vary from about 0.75 to about 2 times the average ureidomethyl functionality of the ureidomethyl diaromatic ether composition. The condensation reaction is carried out in the presence of an inert liquid reaction medium in the presence of a condensation catalyst for urea and formaldehyde.

The ureidomethyl diaromatic ether starting materials are obtained by reacting a halomethyl diaromatic ether such as is disclosed in United States Letters Patent 2,911,380 and urea in an inert liquid reaction medium. For example, chemically stoichiometric amounts of the halomethylated diaromatic ether and urea are dispersed in water and subsequently brought to and maintained at an effective temperature for the reaction, e.g., about 100° C., whereby the urea and halomethylated diaromatic ether are caused to condense. Upon achieving a desired degree of conversion, the adduct reaction product, i.e., the ureidomethyl diaromatic ether starting material for the present invention, is separated from the reaction medium by conventional techniques, e.g., filtration. This preparative procedure is more fully disclosed in my copending application Serial No. 58,907, filed September 28, 1960, and now abandoned.

When formaldehyde is employed, it is preferably in an aqueous form such as a 37 percent aqueous solution. However, different forms such as para-formaldehyde or gaseous formaldehyde can also be utilized, if desired. Other formaldehyde-like compounds that can be similarly employed either in admixture with formaldehyde or separately include trioxymethylene, acetaldehyde, furfuraldehyde and the like.

Catalysts for the initial condensation reaction include inorganic or organic acids or bases, Lewis acids and the like catalysts suitable for promoting the condensation of urea and urea-like compounds with formaldehyde to form water-soluble intermediate resinoids. Specific examples of catalysts that can be employed include organic acids such as phthalic, oxalic, citric, benzoic, acetic, propionic, lactic, maleic, salicylic, terephthalic, tannic and trichloroacetic acids. Examples of inorganic acids include hydrochloric, sulfuric and phosphoric acids. Inorganic bases include the alkali metal carbonates, bicarbonates and hydroxides, ammonia, ammonia hydroxide and calcium and barium hydroxides. Suitable basic organic catalysts are pyridine, triethylenediamine, hexamethylenetetramine and the like. Also operable are such Lewis acids as zinc chloride, phosphorus pentoxide, sulfur dioxide and the like.

To carry out the initial condensation reaction, predetermined amounts of the ureidomethly diaromatic ether composition and formaldehyde or a formaldehyde-like compound are dispersed in a suitable reaction medium. The moles of formaldehyde or molar equivalents of a like compound employed per mole of the substituted ether are from about 0.75 to about 2 times the average ureidomethyl functionality of the ureidomethyl diaromatic ether. The reaction medium may be water or an organo-water system such as methanol-water, ethanol-water, acetone-water and the like systems wherein the organic compound is inert to the reactants. Enough of the inert liquid medium is employed to provide a reaction system that is convenient for manipulative purposes. Usually an amount of such material of from about 10 to 80 percent by weight of the total reaction system is satisfactory.

If necessary, the pH of the reaction medium is adjusted to a suitable level. While the reaction can be conducted at a pH from about 3 up to about 9, it is preferred to operate under neutral or slightly alkaline conditions. The latter conditions are accomplished by the utilization of a sufficient amount of a basic catalyst to neutralize and made slightly alkaline the aqueous solution of formaldehyde or like aldehydic material which normally contains a minor proportion of the corresponding acid. Having formulated the reaction system, it is heated at a temperature from about 80° to about 100° C. The heating is continued until a significant proportion of the reactants has been converted to the desired ureidomethyl diaromatic ether-formaldehyde-type thermosettable resinoid. Usually the resinoid will be subsequently employed as prepared, e.g., in the form of an aqueous dispersion, but if desired, the resinoid can be dehydrated at moderate temperatures to provide a particulate, solid form of the thermosettable resinoid.

The above-prepared intermediate resinoids are heat-curable to infusible, thermoset resins at a temperature within the range from about 50° to about 160° C., preferably about 75° to about 150° C. The presence in the resinoid of acid catalysts such as are known to promote the thermal curing or hardening of urea-formaldehyde-type resinoids is desirable. The curing can be accomplished by heating the material in molds to make solid, thermoset resin articles of desired sizes and shapes.

The cured resins are exceptional binders for a variety of inorganic and organic fillers. The latter include, for example, cellulosic derivatives such as wood flour, walnut shell flour, cottonseed hulls, cotton flock, wood cellulose, sisal fiber, paper, chopped paper, diced resin board, textiles and texile by-products such as macerated fabrics, lignin and the like. Also, proteinaceous fillers such as soy bean meal and keratin and carbonaceous fillers such as graphite, carbon black and the like are other organic fillers often used. Inorganic fillers frequently employed include asbestos, mica, diatomaceous silica, glass fibers, sand, barium sulfate, lead oxide and the like. The cured resins also provide a most advantageous adhesive for the production of plywood, particle board, fiberglass panels and the like composite and laminated articles of construction.

In addition to the foregoing uses, it was found that the initial condensation product of the ureidomethyl diaromatic ether composition and formaldehyde or like compound can be efficaciously employed to modify conventional water-soluble urea-formaldehyde-type resinoids. Thermoset products of mixtures of the conventional resinoids and the condensation product of the invention have significantly enhanced resistances to the degradative action of water and the alkalies. At least about 0.05 part by weight of the above-described resinoid per 1 part of the conventional urea-formaldehyde-type resinoid solids is effective. Preferably, however, at least about 0.1 part by weight of the additive condensate is used. The upper limit is not critical but in most instances, it is desirable not to employ more than 3 parts of the additive for each 1 part of the conventional resinoid. The usual curing techniques involving the normal temperatures and hardening catalysts for urea-formaldehyde-type resinoids are employed to thermoset such mixed resinoids.

A further discovery under the invention revealed that an exceptionally advantageous thermosettable resin for employment in the above uses is obtained in the form of the intermediate condensation product of the above-described ureidomethyl diaromatic ether composition, urea and an effective amount of formaldehyde or formaldehyde-like compound. In accordance with this discovery, the improved, thermosettable resinoid is prepared by reacting these materials in the relative proportions of $X$ moles of the ureidomethyl diaromatic ether composition, $(1-X)$ moles of urea and from about 1.5 to about 2 times $(AX+1-X)$ moles of formaldehyde or formaldehyde molar equivalents of a like compound, wherein $X$ is a number from 0.03 to 0.93 and $A$ is the average ureidomethyl functionality of the ureidomethyl diaromatic ether composition divided by 2. This reaction is carried out in a reaction medium such as water or an organo-water system and in the presence of a catalyst for the condensation of urea and formaldehyde in a like manner to that employed to prepare the previously described condensation products of the ureidomethyl diaromatic ether composition and formaldehyde or like compound. The resulting thermosettable, resinoid which is partially insoluble in water and nearly completely soluble in organo-water solvent systems is heat-curable at a temperature from about 50° to about 160° C., preferably about 75° to about 150° C. and likewise, catalysts for hardening urea-formaldehyde resinoids such as organic and inorganic acidic materials can be utilized to aid their cure.

In a representative operation, a resinoid comprising either the ureidomethyl diaromatic ether-formaldehyde intermediate condensate, a mixture of such a condensate with a conventional soluble urea-formaldehyde-type resinoid or the urea, ureidomethyl diaromatic ether and formaldehyde condensate are prepared in the form of an aqueous solution or dispersion for application to an inert substrate as a thermosettable binder. The solution or dispersion of the resinoid is sprayed, poured or otherwise coated on an inert filler such as is described above. The excess liquid is allowed to drain off and the resulting coated filler mass dried at moderate temperatures. The dried resin-coated mass is shaped by the application of molding pressures and, if desired, simultaneously therewith, or subsequent thereto, subjected to curing temperatures sufficient to provide a thermoset mass. Enough of the thermosetting resinoids should be applied to the filler mass to insure that the ultimately obtained thermoset resin will be adequate for binding the filled mass.

Usually a cured resin binder content of from about 10 to 100 percent based on the weight of the inert filler is sufficient. To obtain this end, such variables as will be obvious to one skilled in the art, as the concentration of the resin-forming ingredients in the dispersed medium, its rate of application and removal, the retentive capacity of the inert filler and the like factors will determine the ultimate quantity of the resinoid that is retained on the filler.

Curing temperatures that are applicable to the unfilled resinoids are also sufficient to cure the filled compositions. Usually, applied temperatures from about 75° up to about 160° C. for periods of time anywhere from about a few seconds to an hour or two are satisfactory to obtain a cured product. The actual rate of cure obtained is dependent upon such variables as the temperature, heat transfer efficiencies realized, thickness of the shaped object to be cured and quantity of residual dispersing medium not removed by drying. The volatile content is preferably at a minimum before the final thermosetting temperatures are applied.

The following examples are illustrative of the invention but should not be construed as limitations thereof.

A 1-liter flask equipped with a stirrer, thermometer and reflux condenser was charged with 136 grams of 4,4′-di(chloromethyl)diphenyloxide, 90 grams of urea and 500 grams of water. This reaction system was stirred while being maintained at a temperature within the range from about 85° to 99° C. for 11.5 hours. During the above period, 4,4′-di(ureidomethyl)diphenyloxide precipitated as a solid product and was thereafter removed from the reaction system by filtration. The solids recovered were washed with 1000 milliliters of water and dried overnight at 40° C. under a high vacuum. The dried product weighed 141 grams and appeared as a snow white powder.

Predetermined portions of the above-prepared di(ureidomethyl)diphenyloxide and formaldehyde were charged to a reaction vessel similar to that employed above. The formaldehyde employed was in the form of a 37 percent aqueous solution which had been adjusted to a pH of about 7.5 by the addition of caustic. The resulting aqueous mixture, which was essentially neutral, was heated to about 95° C., its reflux temperature, and maintained at this temperature for 2 hours. During this period, a 4,4′-di(ureidomethyl)diphenyloxide formaldehyde resinoid formed in the aqueous reaction medium thereby creating a viscous aqueous dispersion.

In further operations, other intermediate thermosettable resinoids were prepared in a similar manner from predetermined proportions of (1) 4,4′-di(ureidomethyl)diphenyloxide, urea and 37 percent aqueous formaldehyde and (2) urea and 37 percent aqueous formaldehyde. The latter condensate was a conventional urea-formaldehyde resinoid prepared for the purposes of comparison. Still another resinoid was prepared as a 50–50 mixture of the conventional urea-formaldehyde resinoid and the 4,4'-di(ureidomethyl diphenyloxide-formaldehyde resinoid.

To 10 grams of the above resinoid composition in the form of "as prepared" aqueous dispersions was added 0.5 milliliter of acetic acid with stirring. The catalyzed resinoids were then cast into wafers about ¼-inch thick which were thermoset by heating them according to a temperature schedule of 50° C. for 20 hours and thereafter 100° C. for 16 hours.

Pieces of each of the cured resin wafers were submersed in boiling water for periods of time of 20 and 40 hours after which periods they were inspected to determine degradation and property retention. The particular resin formulations and results of the foregoing test procedure are set forth in the following table.

TABLE

| Resin No. | Thermosettable Resinoid Composition | | | Resin Surface Characteristics After Submersion in Boiling Water for— | |
|---|---|---|---|---|---|
| | Urea, grams | formaldehyde, 100% basis, grams | 4,4'- diureido-methyl dipenyl oxide, grams | 20 Hours | 40 Hours |
| 1 | 120 | 96 | | Soft [1] | Very Soft.[2] |
| 2 | | 96 | 120 | Hard [3] | Soft.[1] |
| 3 | (50% Resin 1+50% Resin 2) | | | do [3] | Hard.[3] |
| 4 | 100 | 96 | 20 | do [3] | Do.[3] |
| 5 | 88 | 96 | 32 | do [3] | Do.[3] |
| 6 | 72 | 96 | 72 | do [3] | Do.[3] |

[1] A soft surface is such that a layer about 1/16 inch thick peels off by gently scraping the resin surface with a knife blade.
[2] A very soft surface refers to a chalk like appearance. About 1/8 inch of the resin is easily removed with gentle scraping.
[3] A hard surface is impenetrable with a knife blade. After scraping under moderate pressures no material is removed from the cured resin surface.

In a manner similar to that of the foregoing, other resinoids and modified resinoids can be prepared in an identical manner by substituting for the 4,4'-diureidomethyl diphenyl oxide employed above, other materials such as di(ureidomethyl)ditolyloxide, di(ureidomethyl) di(butylphenyl)oxide, tri(ureidomethyl)diphenyloxide, tetra(ureidomethyl)diphenyloxide including the various possible position isomers of the foregoing and the like compositions including mixtures of the foregoing and mixtures of the foregoing with monoureidomethyl derivatives of the diaromatic ether nuclei which mixtures are characterized by an average ureidomethyl functionality of at least 1.5.

What is claimed is:

1. A composition of matter comprising the heat-hardenable intermediate condensation product of a ureidomethyl diaromatic ether composition consisting of at least one compound having the general formula:

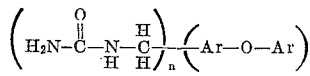

wherein Ar is selected from the group consisting of benzene radicals and nuclearly substituted alkyl and alkoxy derivatives thereof wherein the substituents contain up to 4 carbon atoms and it is an integer from 1 to 4, said composition being further characterized by an average ureidomethyl functionality of at least 1.5, and a number of moles of a material selected from the group consisting of formaldehyde, trioxymethylene, acetaldehyde and furfuraldehyde for each mole of the ureidomethyl diaromatic ether composition employed, which number corresponds to 0.75 to 2 times the average ureidomethyl functionality of the ureidomethyl diaromatic ether composition.

2. A composition as in claim 1 wherein the ureidomethyl diaromatic ether composition consists of at least one ureidomethyl ditolyloxide compound having from 1 to 4 ureidomethyl substituents, said composition being characterized by an average ureidomethyl functionality of at least 1.5.

3. A thermoset product obtained by heating the composition of claim 1 at a temperature within the range from about 50° to about 160° C. in the presence of a thermal hardening catalyst for urea-formaldehyde resinoids.

4. A composition of matter comprising a filler and from about 10 to 100 percent by weight based on the weight of the filler of the thermoset resin of claim 4.

5. A composition of matter comprising one part by weight of a conventional, water-soluble, thermosettable urea-formaldehyde resinoid mixed with from about 0.05 part to 3 parts by weight of the composition of claim 1.

6. A thermoset composition obtained by heating the composition of claim 5 at a temperature from about 50° to 160° C. in the presence of a thermal hardening catalyst for urea-formldehyde resins.

7. A composition of matter comprising a filler and from about 10 to 100 percent by weight based on the weight of the filler of the thermoset resin of claim 6.

8. A composition of matter comprising the heat-hardenable intermediate condensation product of urea, an aldehydic material selected from the group consisting of formaldehyde, trioxymethylene, acetaldehyde and furfuraldehyde, and a ureidomethyl diaromatic ether composition consisting of at least one compound having the general formula:

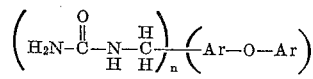

wherein Ar is selected from the group consisting of benzene radicals and nuclearly substituted alkyl and alkoxy derivatives thereof wherein the substituents contain up to 4 carbon atoms and up to 2 of such substituents on the benzene ring are possible and $n$ is an integer from 1 to 4, said composition being further characterized by an average ureidomethyl functionality of at least 1.5; the aforesaid components of the condensation product being present in the relative proportions of X moles of the ureidomethyl diaromatic ether composition, 1—X moles of urea and from about 1.5 to about 2 times $(AX+1-X)$ moles of the aldehydic material, X being a number from 0.03 to 0.93 and A being the average ureidomethyl functionality of the ureidomethyl diaromatic ether composition divided by 2.

9. A composition as in claim 8 wherein the ureidomethyl diaromatic ether composition consists of at least one ureidomethyl ditolyloxide compound having from 1 to 4 ureidomethyl substituents, said composition being characterized by an average ureidomethyl functionality of at least 1.5.

10. A thermoset product obtained by heating the composition of claim 8 at a temperature within the range from about 50° to about 160° C. in the presence of a thermal hardening catalyst for urea-formaldehyde resinoids.

11. A composition of matter comprising a filler and from about 10 to 100 percent by weight based on the weight of the filler of the thermoset resin in claim 10.

12. A composition of matter comprising the heat hardenable intermediate condensation product of a ureidomethyl diaromatic ether composition consisting of at least one ureidomethyl diphenyloxide compound having from 1 to 4 ureidomethyl substituents, said composition being further characterized by an average ureidomethyl functionality of at least 1.5, and a number of moles of a material selected from the group consisting of formaldehyde, trioxymethylene, acetaldehyde and furfuraldehyde for each mole of the ureidomethyl diaromatic ether composition employed, which number corresponds to 0.75 to 2 times the average ureidomethyl functionality of the ureidomethyl diaromatic ether composition.

13. A composition of matter comprising the heat hardenable intermediate condensation product of urea, an aldehydic material selected from the group consisting of formaldehyde, trioxymethylene, acetaldehyde and furfuraldehyde and a ureidomethyl diaromatic ether composition consisting of at least one ureidomethyl diphenyloxide compound having from 1 to 4 ureidomethyl substituents, said composition being further characterized by an average ureidomethyl functionality of at least 1.5; the aforesaid components being present in the condensation product in the relative proportions of X moles of the ureidomethyl diaromatic ether composition, $1-X$ moles of urea and from about 1.5 to about 2 times $(AX+1-X)$ moles of the aldehydic material, X being a number from 0.03 to 0.93 and A being the average ureidomethyl functionality of the ureidomethyl diaromatic ether composition divided by 2.

14. A composition of matter comprising the heat hardenable intermediate condensation product of a ureidomethyl diaromatic ether composition consisting of at least one ureidomethyl diphenyloxide compound having from 1 to 4 ureidomethyl substituents, said composition being characterized by an average ureidomethyl functionality of at least 1.5 and a number of moles of formaldehyde for each mole of the ureidomethyl diaromatic ether composition employed, which number of moles corresponds to 0.75 to 2 times the average ureidomethyl functionality of the ureidomethyl diphenyloxide composition.

15. A composition of matter comprising the heat hardenable intermediate condensation product of urea, formaldehyde, and a ureidomethyl diaromatic ether composition consisting of at least one ureidomethyl diphenyloxide compound having from 1 to 4 ureidomethyl substituents, said composition being characterized by an average ureidomethyl functionality of at least 1.5; the aforesaid components being present in the condensation product in the relative proportions of X moles of the ureidomethyl diaromatic ether composition, $1-X$ moles of urea and from about 1.5 to about 2 times $(AX+1-X)$ moles of formaldehyde, X being a number from 0.03 to 0.93 and A being the average ureidomethyl functionality of the ureidomethyl diaromatic ether composition divided by 2.

References Cited
UNITED STATES PATENTS

| | | | |
|---|---|---|---|
| 2,873,299 | 2/1959 | Mideska | 260—2 |
| 2,911,380 | 11/1959 | Doedens | 260—2.5 |
| 2,978,517 | 4/1961 | Schiller | 260—649 |
| 3,000,839 | 9/1961 | Rosenbrook et al. | 260—2.5 |
| 3,038,871 | 6/1962 | Doedens | 260—2 |
| 3,169,939 | 2/1965 | Cordts | 260—47 |

WILLIAM H. SHORT, *Primary Examiner.*

M. GOLDSTEIN, J. C. MARTIN, A. H. KOECKERT,
*Assistant Examiners.*